US009866813B2

United States Patent
Ward et al.

(10) Patent No.: US 9,866,813 B2
(45) Date of Patent: Jan. 9, 2018

(54) AUTOSTEREO TAPESTRY REPRESENTATION

(71) Applicant: Dolby Laboratories Licensing Corporation, San Francisco, CA (US)

(72) Inventors: Gregory John Ward, Berkeley, CA (US); Timo Kunkel, Oakland, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 223 days.

(21) Appl. No.: 14/309,965

(22) Filed: Jun. 20, 2014

(65) Prior Publication Data

US 2015/0009302 A1  Jan. 8, 2015

Related U.S. Application Data

(60) Provisional application No. 61/843,250, filed on Jul. 5, 2013.

(51) Int. Cl.
*H04N 13/02* (2006.01)
*H04N 13/00* (2006.01)

(52) U.S. Cl.
CPC ............... *H04N 13/0011* (2013.01)

(58) Field of Classification Search
CPC .................................. H04N 13/0011
USPC .......................................... 348/51
See application file for complete search history.

(56) References Cited

U.S. PATENT DOCUMENTS

| 8,155,461 | B2 | 4/2012 | Moon |
| 8,280,149 | B2 | 10/2012 | Yu |
| 8,384,763 | B2 | 2/2013 | Tam |
| 2009/0015662 | A1* | 1/2009 | Kim ............ H04N 19/593 348/43 |
| 2010/0215251 | A1 | 8/2010 | Klein Gunnewiek |
| 2010/0271511 | A1 | 10/2010 | Ma |
| 2011/0026809 | A1* | 2/2011 | Jeong ............ G06T 7/0022 382/154 |
| 2011/0058021 | A1* | 3/2011 | Chen ............ G06T 15/205 348/46 |
| 2011/0063420 | A1 | 3/2011 | Masuda |
| 2011/0080466 | A1 | 4/2011 | Kask |
| 2011/0205226 | A1 | 8/2011 | Gremse |

(Continued)

FOREIGN PATENT DOCUMENTS

| WO | 2012/062652 | 5/2012 |
| WO | 2012/097802 | 7/2012 |

(Continued)

OTHER PUBLICATIONS

Merkle et al., "Multi-View Video Plus Depth Representation and Coding", 2007, IEEE, pp. 201-204.*

(Continued)

*Primary Examiner* — Gims Philippe
*Assistant Examiner* — Amir Shahnami

(57) ABSTRACT

Representation and coding of multi-view images are carried out through tapestry encoding. A tapestry comprises information on a tapestry image, a left-shift displacement map and a right-shift displacement map. Perspective images of a scene can be generated from the tapestry and the displacement maps. The tapestry image is generated from a leftmost view image, a rightmost view image, a disparity map and an occlusion map.

17 Claims, 8 Drawing Sheets

(56) References Cited

U.S. PATENT DOCUMENTS

| | | | |
|---|---|---|---|
| 2011/0242278 A1 | 10/2011 | Yang | |
| 2011/0261050 A1 | 10/2011 | Smolic | |
| 2011/0304708 A1 | 12/2011 | Ignatov | |
| 2012/0062548 A1 | 3/2012 | Pan | |
| 2012/0162193 A1 | 6/2012 | Bae | |
| 2013/0027513 A1 | 1/2013 | Corral-Soto | |
| 2014/0176539 A1* | 6/2014 | Tsubaki | G06T 7/0075 345/419 |
| 2014/0198182 A1 | 7/2014 | Ward | |

FOREIGN PATENT DOCUMENTS

| | | |
|---|---|---|
| WO | 2013/014177 | 1/2013 |
| WO | 2013/054240 | 4/2013 |
| WO | 2013/062944 | 5/2013 |
| WO | 2013/068271 | 5/2013 |

OTHER PUBLICATIONS

Tzovaras et al, "Disparity field and depth map coding for Multiview 3D image generation", Aug. 8, 1996, Signal Processing: Image Communication 11, pp. 206-228.*

Keribiou, Paul "3D4YOU, WP3-Deliverable D3.3.2, Comparative Study and Recommendations" Dec. 30, 2010, pp. 1-79.

Rademacher, P. et al "Multiple-Center of Projection Images" Computer Graphics Proceedings, Proceedings of Siggraph Annual International Conference on Computer Graphics and Interactive Techniques, vol. 423, Jan. 1, 1998, pp. 199-206.

Ohm, Jens-Rainer, et al "Incomplete 3D Representation of Video Objects for Multiview Applications", Proc. of the European Conference on Multimedia Applications, Services and Techniques, No. 143, May 26, 1998, pp. 427-432.

Gunnewiek, R.K. et al "Coherent Spatial and Temporal Occlusion Generation" SPIE 7237, Stereoscopic Displays and Applications, Feb. 18, 2009, 10 pages.

Jeong, Y.J. et al "Depth-Image-Based Rendering (DIBR) Using Disocclusion Area Restoration" SID Symposium Digest of Technical Papers, vol. 40, Issue 1, pp. 119-122, Jun. 2009.

Wang, L. et al "Stereoscopic Inpainting: Joint Color and Depth Completion from Stereo Images" IEEE Conference on Computer Vision and Pattern Recognition, Jun. 23-28, 2009, pp. 1-8.

Ince, S. et al "Occlusion-Aware View Interpolation" EURASIP Journal on Image and Video Processing, Dec. 2, 2008.

Rother, C. et al "Digital Tapestry (Automatic Image Synthesis)" IEEE Computer Society Conference on Computer Vision and Pattern Recognition, Jun. 20-25, 2005, pp. 589-596, vol. 1.

Shah, M.M. "Occlusion in Augmented Reality" 8th International Conference on Information Science and Digital Content Technology, vol. 2, Jun. 26-28, 2012.

Reddy, V. et al "A Fast Method for Global Depth-Map Extraction from Natural Images" Proceedings of the 9th European Conference on Visual Media Production, pp. 59-65, 2012.

Jain, A.K. et al "Efficient Stereo-to-Multiview Synthesis" 2011 IEEE International Conference on Acoustics, Speech and Signal Processing, May 22-27, 2011, pp. 889-892.

Mozerov, M. et al "Trinocular Stereo Matching with Composite Disparity Space Image" 2009 16th IEEE International Conference on Image Processing, Nov. 7-20, 2009, pp. 2089-2092.

Niquin, C. et al "An Occlusion Approach with Consistency Constraint for Multiscopic Depth Extraction" International Journal of Digital Multimedia Broadcasting, vol. 2010, 8 pages.

Jang, Woo-Seok, et al "Efficient Disparity Map Estimation Using Occlusion Handling for Various 3D Multimedia Applications" IEEE Transactions on Consumer Electronics, vol. 57, Issue: 4, Nov. 2011, pp. 1937-1943.

Peng, Qi "Fast Stereo Matching for High Resolution Stereo Image and Occlusion Handling" Sep. 2012, Journal of Convergence Information Technology, v. 7, No. 16, pp. 27-35.

* cited by examiner

AUTOSTEREO TAPESTRY REPRESENTATION

CROSS REFERENCE TO RELATED APPLICATIONS

This application claims the benefit of priority to U.S. Provisional Patent Application Ser. No. 61/843,250, filed on Jul. 5, 2013, which is incorporated herein in its entirety. The present application may be related to U.S. Provisional Patent Application No. 61/541,050, filed on Sep. 29, 2011, and PCT Application PCT/US2012/057616, filed on Sep. 27, 2012, all of which are hereby incorporated by reference in their entirety.

TECHNICAL FIELD

The present disclosure relates to image processing, such as 3D imaging. More particularly, it relates to autostereoscopy systems and methods.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Figure 1:
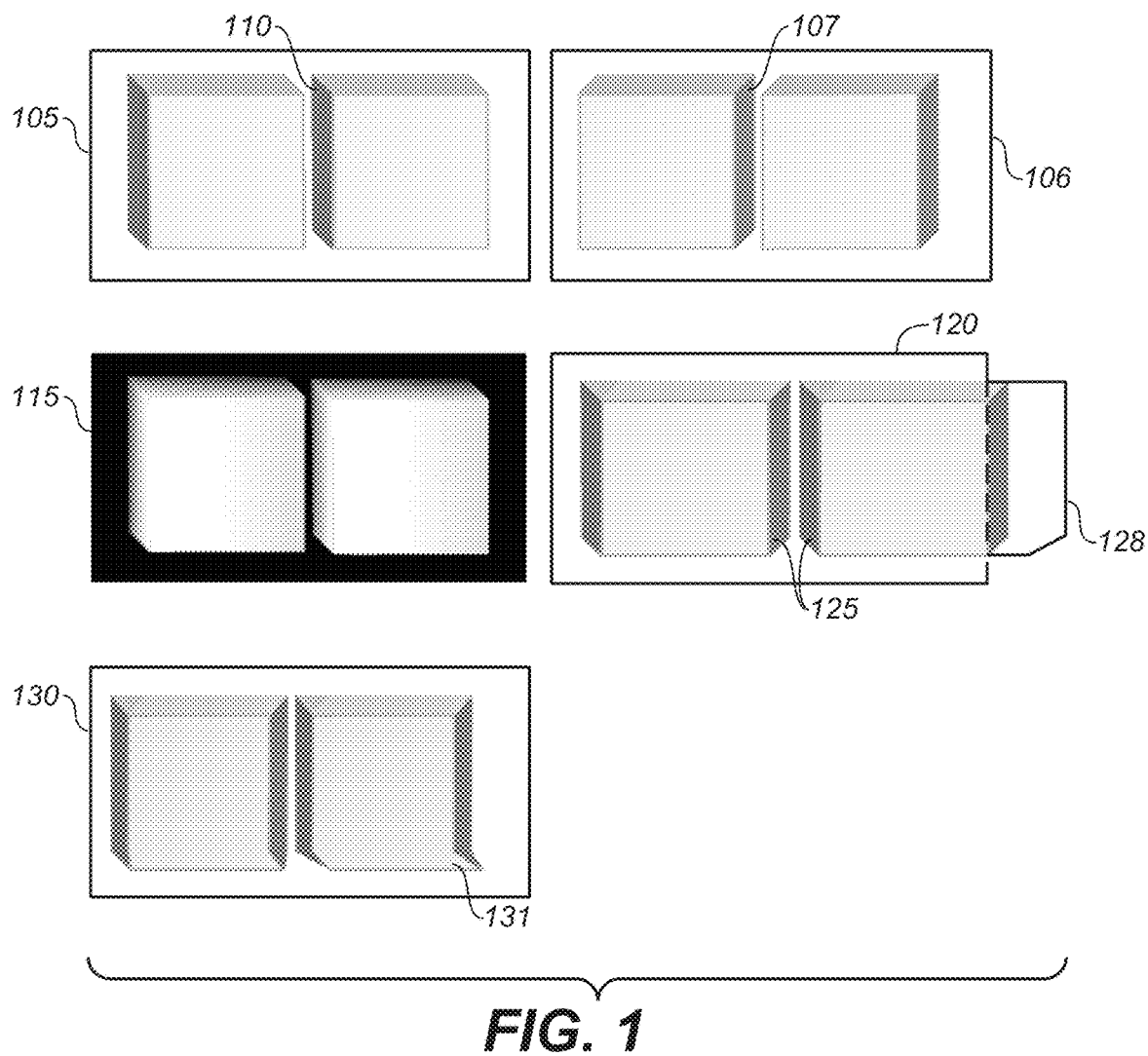
FIG. 1 depicts an exemplary embodiment of a tapestry image generation using cube images as an example.

Image processing for images and displays in higher than two dimensions, e.g. 3D, involves processing and transmitting of information related to a scene as viewed from multiple viewpoints. An image captured by viewing a scene from a viewpoint can be referred to as a view. Such images, can, for example, be displayed in stereoscopic and autostereoscopic displays. In particular, autostereoscopic devices are able to provide stereoscopic vision without the use of 3D glasses.

As described herein, an 'autostereo image' is an image which is able to provide stereoscopic vision without the use of 3D glasses. As described herein, a 'scene' is the content of an image or picture, for example, a scene might be a wideshot of downtown Los Angeles, or a close-up view of multiple objects on a table. As described herein, a 'leftmost view' is an image, for example captured by a camera, taken from the leftmost point of view, looking at a scene. As described herein, a 'rightmost' view is an image, for example captured by a camera, taken from the rightmost point of view, looking at a scene. As described herein, a 'disparity map' is a group of values associated with an image, which describes a difference between values of two maps or images. For example a disparity map might describe the difference in position between a left view and a right view, the two views constituting a stereo image. The disparity map might have a value for each pixel, describing the apparent motion for that pixel, between the left view image and the right view image. The apparent motion may be described as pixel intensity in the disparity map.

An autostereo display provides multiple views, from a few to over 27 currently, but it is envisioned that the number of views will eventually be as high as 60, and possibly higher. The purpose of providing such a high number of views is for multiple audience members to be able to view a scene from different locations while receiving, at each location, a left and right eye view, both of which are needed for stereo perception. Only two views (a left eye and a right eye view) are needed at a specific location, but a viewer (or a group of viewers) might be positioned at different locations which are not necessarily known in advance.

Additionally, providing multiple views enables a single viewer to see incrementally new views of a scene with even slight head movements. In such cases, a certain degree of parallax is provided as well, giving the audience a "peer-around" effect as they shift their heads horizontally. In the following disclosure of features and examples, horizontal-only autostereo systems and methods are described. However, this is not intended as a limitation as the person skilled in the art will be readily able to apply similar systems and methods to the vertical direction as well. As described herein, a view corresponds to an image seen from a specific viewpoint. Several representations are possible for multi-view imagery suitable for autostereo display. This disclosure describes a representation for multi-view imagery suitable for autostereo display.

When processing and transmitting multiple views, some information of a scene may be occluded in one view, but may be visible in one or more other views. As a trivial example, by closing alternatively the right eye and the left eye, a person will see some things in the field of view of the left eye, which are not visible to the right eye (assuming the person does not move). When encoding a stream of images for transmission, it may be possible to simply include all possible views, however this increases the amount of bandwidth required, and the computational complexity of the processing, encoding, transmitting and decoding steps required. An alternative is to transmit one image which contains as much information as possible (within the technical requirements of the image processing hardware utilized), together with metadata which makes it possible to derive different views of the same scene, from the one transmitted image.

In other words, there are currently two major approaches to autostereo representation and transmission. The first is to store as many images as there are views required by the target display, and record and transmit these as separate streams. Among other problems, this also tends to be a method that is difficult to adapt to different hardware targets (e.g. displays). The second approach is to record a single perspective (e.g., a single view image, or reference image) along with a distance value for each pixel (e.g., a depth map, or how far from the viewer each pixel is). Subsequently, view-synthesis techniques can be used to generate the needed image for each specific, different view, based on the reference image and the depth map. For example, left eye and right eye images may be derived, thereby enabling stereoscopic vision.

Using the per-pixel depth (the depth map), it is possible to predict the position of a pixel in closely related views (e.g., mid right, and extreme right). The caveat to this approach is that disoccluded regions in the image (regions that were occluded in the reference view that are revealed in the needed view) may occur in certain viewpoints but may have no corresponding image data. In this case such pixels would need to be filled. While there are techniques for "filling-in" these regions, they are generally most successful for disoccluded regions that are of uniform color. Such techniques often do less well for regions with gradient colors and texture. The most difficult region to fill is that containing SKE (signal-known-exactly) content, such as alphanumeric and other graphical imagery, faces, and small known objects which may be easily recognizable by a human viewer, but not by a computerized filling method.

An alternative image processing method is herein disclosed, which enables a more comprehensive inclusion of data in the image which is used to predict multiple views, thereby improving image quality, and limiting artifacts in the final image. As described herein, such autostereoscopic representation is referred to as autostereoscopic tapestry representation (or, in short, tapestry or tapestry representation), because it covers most of the points of interest in a scene, similarly to laying a thin cloth over objects and recording their colors.

According to a first aspect of the disclosure, a computer-based method for generating an autostereo tapestry image is described, the method comprising: providing a leftmost view image of a scene; providing a rightmost view image of the scene; forming, by a computer, a disparity map, wherein the disparity map comprises distance information between the leftmost view image and the rightmost view image; forming, by a computer, an occlusion map, wherein the occlusion map comprises information on pixels visible in the rightmost view image but not visible in the leftmost view image; forming, by a computer, an autostereo tapestry image by inserting in the leftmost view image the pixels visible in the rightmost view image but not visible in the leftmost view image; forming, by a computer, a left-shift displacement map, wherein the left-shift displacement map comprises distance information between the leftmost view image and the autostereo tapestry image; and forming, by a computer, a right-shift displacement map, wherein the right-shift displacement map comprises distance information between the rightmost view image and the autostereo tapestry image.

According to a second aspect of the disclosure, an encoding system is described, the system comprising: a tapestry generator adapted to generate a tapestry image, a left-displacement map and a right-displacement map based on a disparity map, an occlusion map and a plurality of views comprising at least a leftmost and a rightmost input views; and an encoder adapted to encode the tapestry image, the left-displacement map and the right-displacement map into a bitstream.

According to a third aspect of the disclosure, a decoding system is described, the system comprising: a decoder adapted to decode a tapestry image, a left-shift displacement map and a right-shift displacement map, wherein the tapestry image, the left-shift displacement map and the right-shift displacement map are based on one or more input views; and a view generation unit adapted to derive one or more output images of a scene based on the tapestry image, the left-shift displacement map and the right-shift displacement map.

In several embodiments of the disclosure, two extreme views (e.g. far left and far right) are provided as a bounding input, corresponding to the leftmost and rightmost eye position in the target device class. They are bounding in the sense that all possible views which can be derived will be contained within these far left and far right. In other embodiments, a different choice of the 'extreme' views might be taken, which is substantially close to the far left and far right.

For example, the target device class might be a handheld device. A handheld device will have a leftmost and rightmost eye position which are different from a living room TV typical arrangement viewable from a couch, in turn different from a cinema display in a commercial venue. Such leftmost and rightmost images are used as input for the subsequent processing.

In other embodiments, the two extreme views (e.g. far left and far right) are also provided as a bounding input, however their choice is not limited to a specific target device class, as the subsequent processing aims at creating a tapestry image which can be decoded to reconstruct left and right view images for different target devices.

In several embodiments of the disclosure, using techniques described herein, a tapestry representation is derived that contains foreground and background pixels from both leftmost and rightmost views and a pair of displacement maps that indicate how these pixels were shifted relative to each of the two original leftmost and rightmost views. This representation has similar advantages to the representation, described above, using a single image plus depth map, but in addition it often does not have a need to fill disoccluded regions, as everything that was seen from the two input views (leftmost and rightmost) can be present in the combined tapestry output. In some embodiments of the disclosure, the conveyance of the disoccluded regions is not perfect, and consequently some disoccluded regions will not have associated image information. However, even in such cases, the amount of artifacts potentially present in the final image is reduced.

Referring to FIG. 1, a left eye view (105) and a right eye view (106) are provided. Two exemplary areas are shown of occluded regions: area (110) is occluded to the right eye, while area (107) is occluded to the left eye. In several embodiments, the left eye view (105) and right eye view (106) comprise the leftmost eye view and rightmost eye view. The left eye view (105) and right eye view (106) are the input images for the subsequent processing. For example, with no loss of generality, the two views may be acquired by two identical cameras having only a horizontal offset between them. Different cameras may be used, for example the cameras may have either parallel optical axis, or convergent axis.

Depth information for the image pixels of one of the two input images, (105) or (106), is acquired, for example for the left eye view (105) in FIG. 1, thus obtaining a depth map (115). Alternatively, a stereo correspondence technique could be used to determine the differences between the left eye view (105) and the right eye view (106). The purpose of this step is to determine which pixels from the left eye view (105) and the right eye view (106) are common to the two input images (105) and (106), as well as which pixels are present in the right eye view image (106) but not in the left eye view image (105). An image can then be created (120) which includes both the pixels common to the views (105) and (106), as well as the pixels from the right eye view (106) that are not found in the left eye view image (105). Alternatively, a different choice might be made, to use the right eye view (106) as a basis, in which case pixels present in the left eye view (105) but not in the right eye view (106) would be inserted in the expanded image (120). Such alternative approach could be used for any embodiment of the disclosure.

Continuing with the example of FIG. 1, using the left eye view (105) as a basis, the image (120) is obtained, which includes information from both images (105) and (106), and is therefore termed an expanded image. This expanded tapestry image (120) contains the occluded regions (125) of both views (105) and (106), and may also contain an expanded area outline (128) with occluded regions which extends beyond the standard image dimension of the input views (105) and (106). The expanded image (120) may be optionally squeezed horizontally to fit within the original image size of the input views (105) and (106). This optional compression is shown in the image (130). In the image (130) a more heavily compressed region (131) is visible, corresponding to the scanlines which contain a greater part of occluded regions. As known by those skilled in the art, a scanline corresponds to a horizontal row in the image.

In some embodiments, a disparity map may need to be calculated, such as with optically captured scenes or other un-informed image input. In other implementations, a disparity map may be derived from available depth maps, such as from a computer rendering, or from post-production algorithms, perhaps including human modifications.

Figure 2:
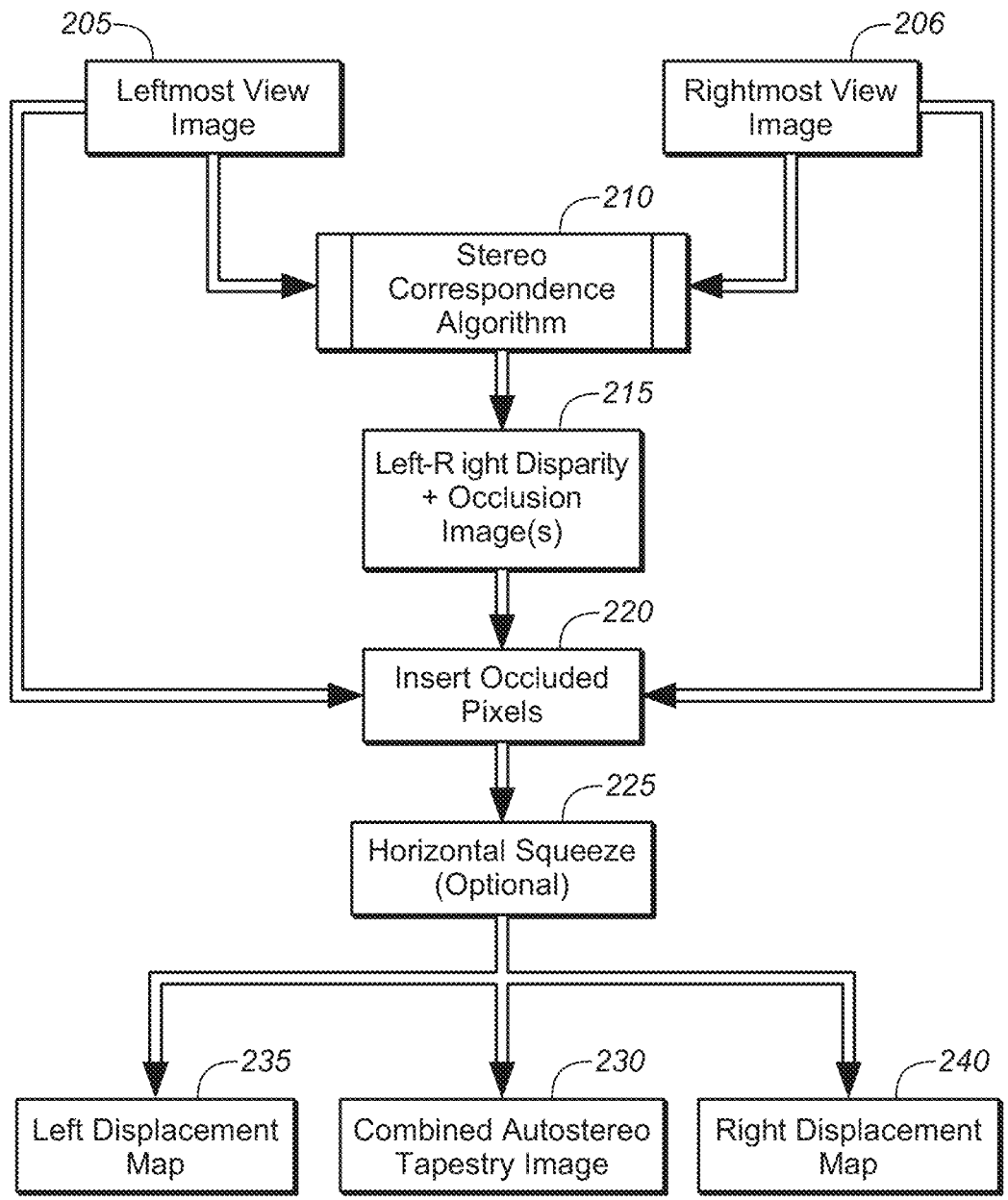
FIG. 2 depicts an exemplary embodiment of a method for tapestry image generation.

FIG. 2 illustrates an embodiment of tapestry construction with a block diagram. A left (205) and right (206) image inputs are provided. These two images (205,206) are analyzed through a stereo correspondence algorithm (210). Several correspondence algorithms known to the person skilled in the art could be used. As mentioned above, an alternate embodiment is to use an input depth map generated by other means, instead of the correspondence algorithm (210). Therefore, step (210) may comprise a correspondence algorithm (210) or an alternative method based on a depth map. After step (210), at least one image comprising a disparity map and an occlusion map are obtained (215).

In the next step, the left (205) and right (206) images, together with the disparity and occlusion maps (215), are input a module which inserts occluded pixels (220). In step (220), the occlusion map (215) is used to guide the insertion of pixels from the right image (206) into the left image (205). Alternatively, the occlusion map (215) could be used to guide the insertion of pixels from the left image (205) into the right image (206).

It may be advantageous to produce a consistent scanline that minimizes depth discontinuities thus ensuring efficient encoding of the final result. An optional "Horizontal Squeeze" (225) stage reduces each scanline to the original length of the input images (205,206) by any number of resampling techniques such as nearest neighbor or cubic spline. In this embodiment, the final outputs are: the (optionally squeezed) tapestry image (230) and two displacement maps (235,240), one for the left extreme image (235) and one for the right (240).

Figure 3:
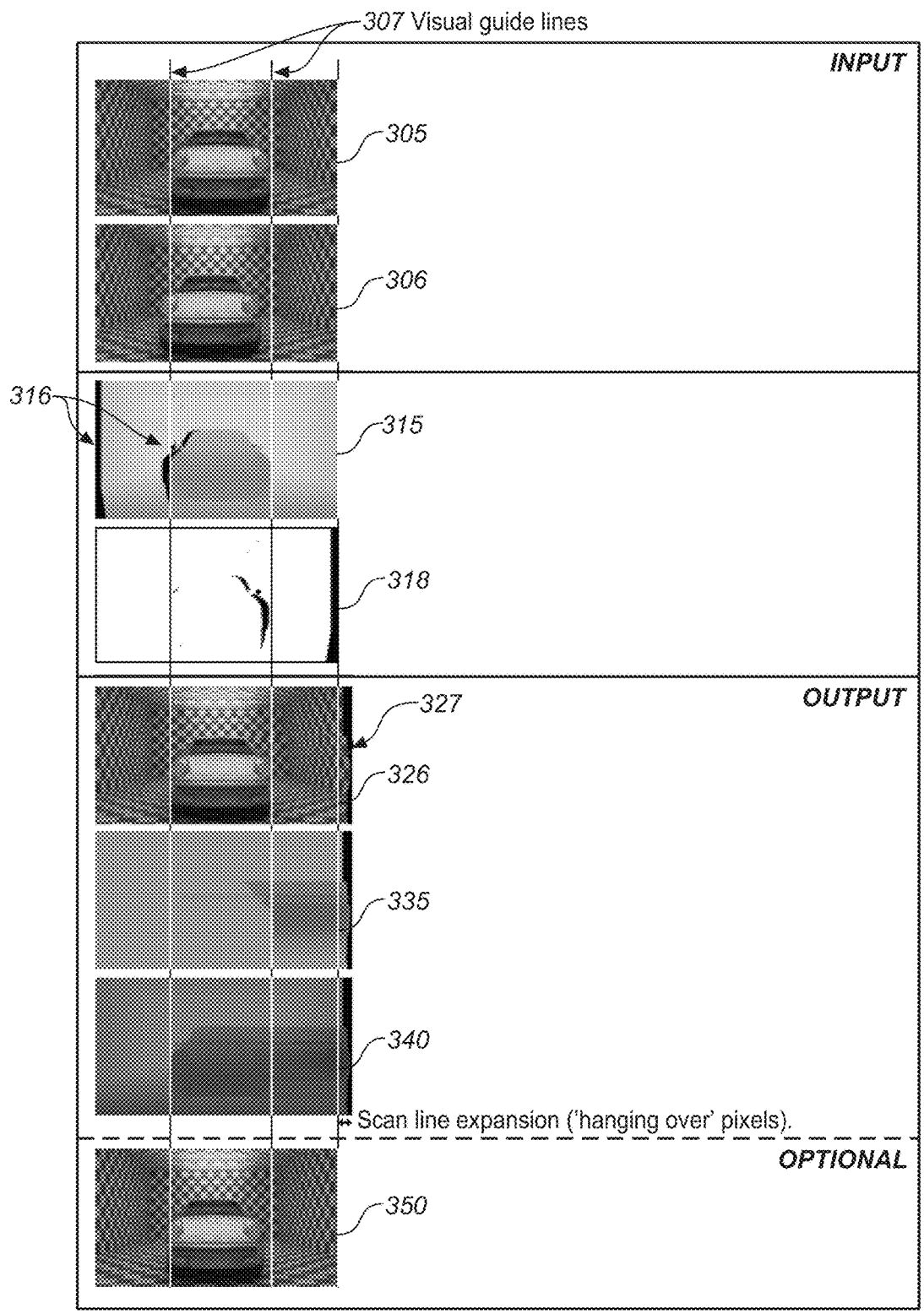
FIG. 3 depicts an exemplary embodiment of the method of FIG. 2 with a car image.

FIG. 3 illustrates an embodiment of a tapestry generation process with an example scene. A tapestry may be computed either in parallel or sequentially, as the algorithm used is mostly scanline-independent, therefore it can be executed in parallel. A left (305) and right (306) extreme images are shown at the top of FIG. 3. The visual guidelines (307) make apparent the different perspective of the leftmost (305) and rightmost (306) images. A displacement (disparity) map (315) gives the horizontal offsets needed in the pixels of the right image (306) to get to their corresponding position in the left view (305). The displacement map (315) may be computed using a stereo matching algorithm or derived from a depth map. Occluded regions (316) are shown in the map (315).

A map (318) of occluded pixels in the right view (306) as seen from the left (305) may also be computed. The occluded pixels are pixels of the rightmost view (306) which cannot be seen (are occluded) from the leftmost view (305) point of view. Alternatively, a similar process would occur in reverse for the left view (305) as seen from the right (306), but only one approach is needed for a given implementation. In this example, pixels from the rightmost view (306) are inserted into the leftmost (305) to form a tapestry, so the occlusion map (318) is used to indicate which pixels to insert.

The completed tapestry image (326) is shown in FIG. 3 with the pixel insertions determined in the previous steps (315, 318). Such pixel insertions can cause data to overflow the right-hand margin (327). The more occluded areas there are, the further the scanline will expand to the side (327). The expanded tapestry image (326), containing the disoccluded views can then be stored or transmitted. The disoccluded views comprise information that is absent in either the leftmost (305) or rightmost (306) views, but is included in the tapestry image (326). In some applications, it may be desired to keep the image format dimensions of image (326) the same as the input dimensions of views (305) and (306) (e.g., 1920×1080 for an HD image format).

The left-shift displacement map (335) records the pixel offsets needed in the transformation from the tapestry image (326) to the leftmost view image (305). In one embodiment, the offsets may be encoded as intensity in image (335). It can be noted that each scanline expands independently of the other scanlines. Image (340) records the offsets needed in the transformation from the tapestry image (326) to the rightmost view image (306). Image (340) may be obtained from the disparity map (315) plus information on the pixel shifts inserted in the tapestry image (326).

In a last step, all three maps (326, 335, 340) may be compressed back to the original image size of images (305,306), as shown in image (350). Compression will also modify the displacement values as compressed pixels are also displaced. Alternatively, the pixels overflowing the original image size, such as the pixels in (327), may be encoded as a sidechannel.

The embodiment of FIG. 3 describes how to encode a tapestry image, with metadata which permits reconstructing the original views (305,306). The images (326, 335, 340), or alternatively, image (350) plus a sidechannel describing the overflowing pixels, may be transmitted to a desired hardware. The hardware then decodes the received information and reconstructs views (305,306) from (for example) images (326, 335, 340).

Figure 4:
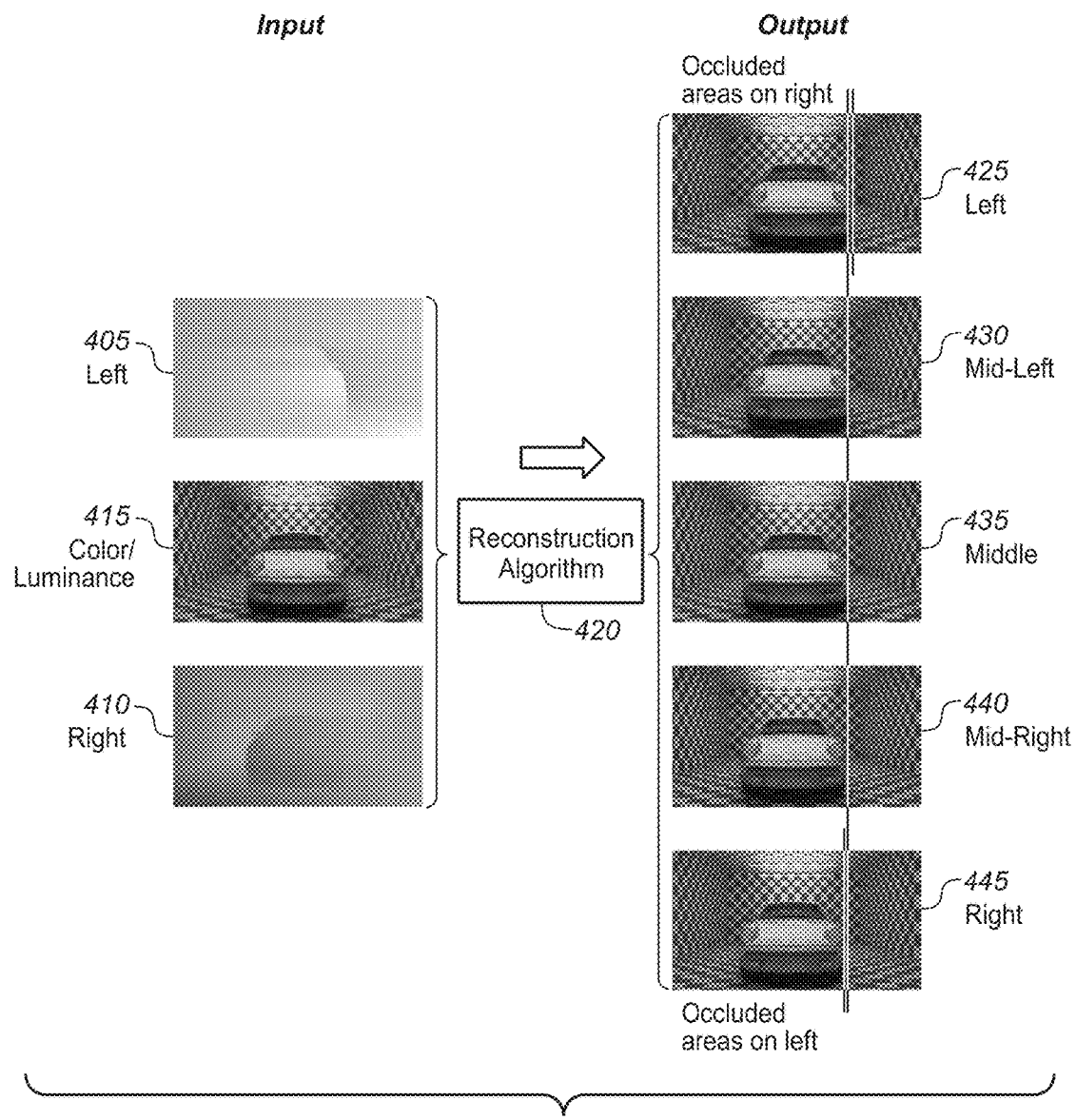
FIG. 4 depicts an exemplary embodiment of a reconstruction algorithm.

FIG. 4 illustrates an example embodiment of a reconstruction algorithm, using the left (335) and right (340) displacement maps of FIG. 3. Referring to FIG. 3, thanks to the additional information about occluded regions included in a tapestry image, such as image (327) or (350), it may be possible to render any desired view between the left (305) and right (306) extreme input views (305,306) with a minimum of pixel infilling required. Since pixel infilling may introduce artifacts, this is a desirable outcome. The cases that require filling—in occur when an occluded region is occluded to both the left (305) and right (306) bounding viewpoints (305,306). These types of occlusions may often be caused by cavity structures, and the narrower cavities have more mutual occlusions, common to both left (305) and right (306) viewpoints. An example would be looking into the barrel of a gun. However, the narrower cavities often have a relatively low amount of pixels in their regions. Also, cavities tend to be shadowed regions, so the problems due to needed infilling are vastly reduced as compared to the disoccluded regions corresponding to the open sides of objects, which normally will have more details and structure.

In FIG. 4, the left-shift displacement map (405) and the right-shift displacement map (410) are used with tapestry image (415) by the reconstruction algorithm (420). Any intermediate horizontal viewpoint between the leftmost (425) and rightmost (445) viewpoints can be calculated. In FIG. 4, some examples are shown, such as mid left (430), middle (435), and mid right (440).

Figure 5:
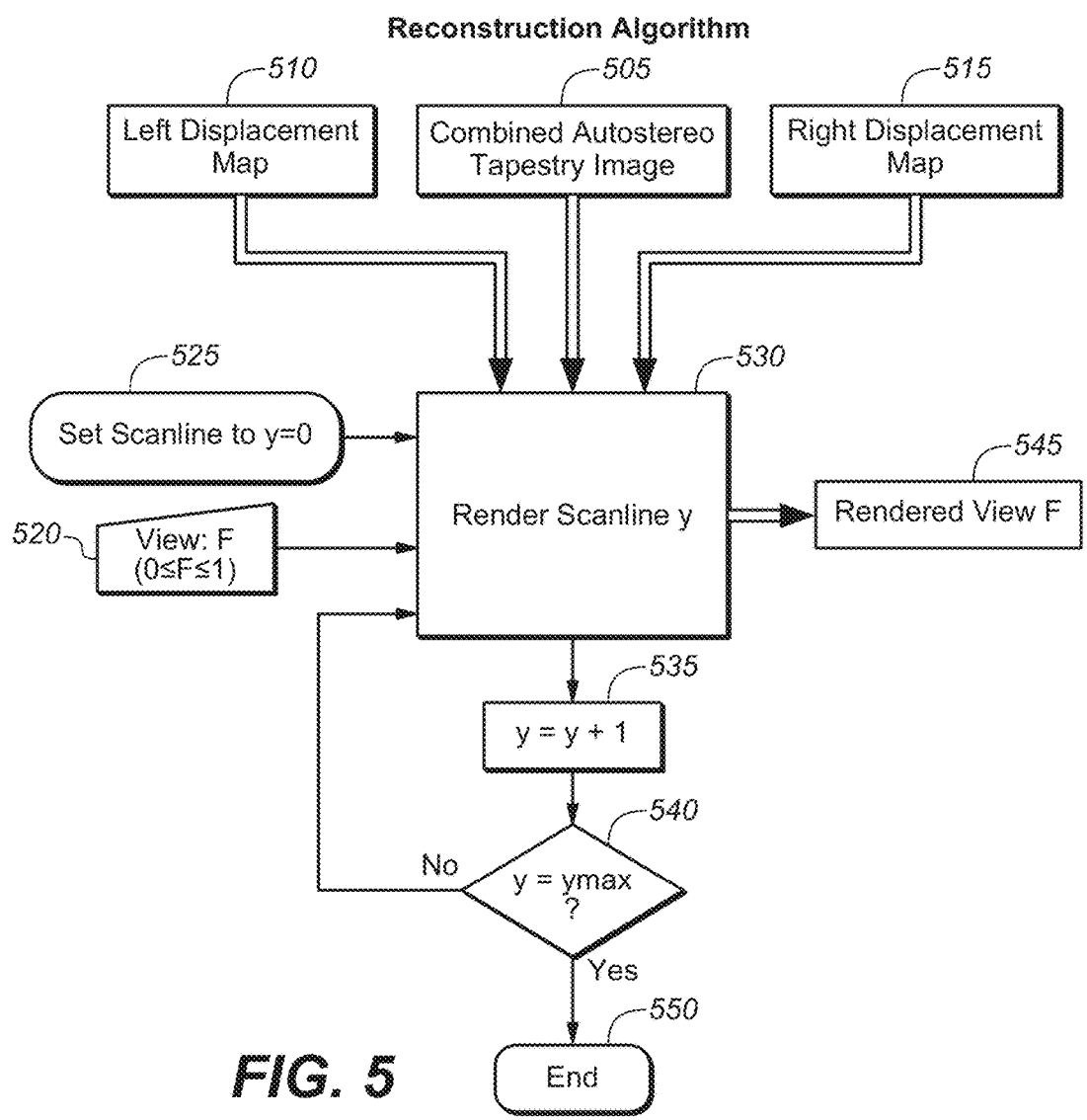
FIG. 5 depicts an exemplary embodiment of a reconstruction algorithm method.

FIG. 5 illustrates in details an embodiment of the reconstruction algorithm (420) of FIG. 4. Referring to FIG. 5, an overview of the reconstruction process is shown. An autostereo tapestry image (505) is provided together with left (510) and right (515) displacement maps. A parameter F (520) may be provided, for example by the overall display system, such as a fixed viewpoint index (in the lenticular screen AS3D approach), or a variable viewpoint index (in the head tracking approach). The F parameter (520) may indicate the desired position between the left and right views. In an autostereo display, multiple calls would render the required views specific to that device. Scanlines are then generated independently, and may in fact be computed in parallel, since there is no interaction between them. The person skilled in the art will understand the advantage of the reconstruction algorithm of FIG. 5, as it is adaptable to various displays and technologies and can render any viewpoint requested through the parameter F (520).

In the example embodiment of FIG. 5, the reconstruction algorithm may be initialized by starting at scanline y=0 (525). The y variable may refer to the vertical direction, in which case y=0 corresponds to the bottom row of an image. The rendering process (530) may then proceed through a counter (535) and a 'task complete' check (540). Each scanline, for a provided F factor (520), is rendered (545), until the whole image is rendered and the task is complete (550).

Figure 6:
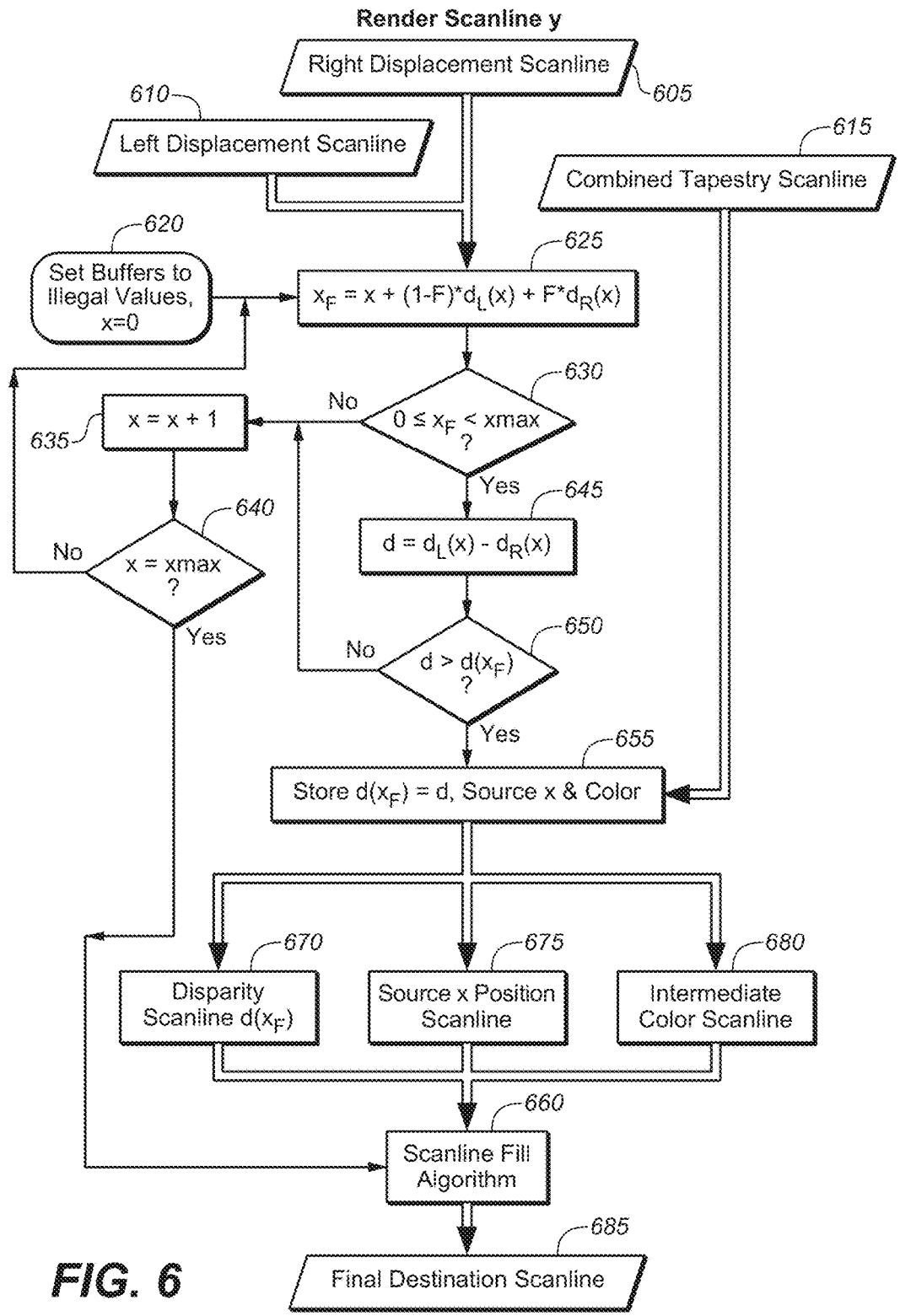
FIG. 6 depicts an exemplary embodiment of a scanline rendering algorithm.

Referring now to FIG. 6, an exemplary embodiment of the scanline rendering algorithm (530) of the reconstruction algorithm of FIG. 5 is shown in detail. In FIG. 6, a right displacement scanline (605) and a left displacement scanline (610) are provided, together with a tapestry scanline (615). These three images (605,610,615) may correspond, for example, to images (405,410,415) of FIG. 4.

Referring to FIG. 6, an exemplary scanline reconstruction process may begin by clearing three output buffers to illegal values (620). For example, in the case of the displacement scanline and the source x position scanline, we may use a value of −1. The x variable may refer to the horizontal direction, in which case x=0 corresponds to the left side vertical edge of an image (and of a scanline). The intermediate color scanline may typically be cleared to all black. For each source scanline position x, the algorithm generates a destination position $x_F$ (625) from the target view position F and the corresponding input displacements $d_L(x)$ and $d_R(x)$. The destination position $x_F$ (625) may be calculated according to equation:

$$x_F = x + (1-F)d_L(x) + Fd_R(x).$$

If, in step (630), the destination position $x_F$ (625) is outside the boundaries of the destination image, the algorithm skips it and moves to the next source position (635), also checking whether the end of the scanline has been reached (640).

If destination position $x_F$ (625) is inside the boundaries of the destination image, the algorithm considers the stereo disparity $d = d_L(x) - d_R(x)$ (645) to determine whether the source pixel which is being relocated is now in front of any previous pixel already present at position $x_F$. If the new pixel has a larger disparity than the previous pixel (650), then the previous pixel is replaced and the disparity d, source x position, and intermediate color pixels at position $x_F$ (which all constitute an autostereo tapestry information) are all replaced with the corresponding new values (655). In fact, a larger disparity map implies a pixel is in front of a pixel with a smaller disparity map. In a few destination pixels, there may be no source information, and so a final step may be a scanline filling algorithm (660).

Figure 7:
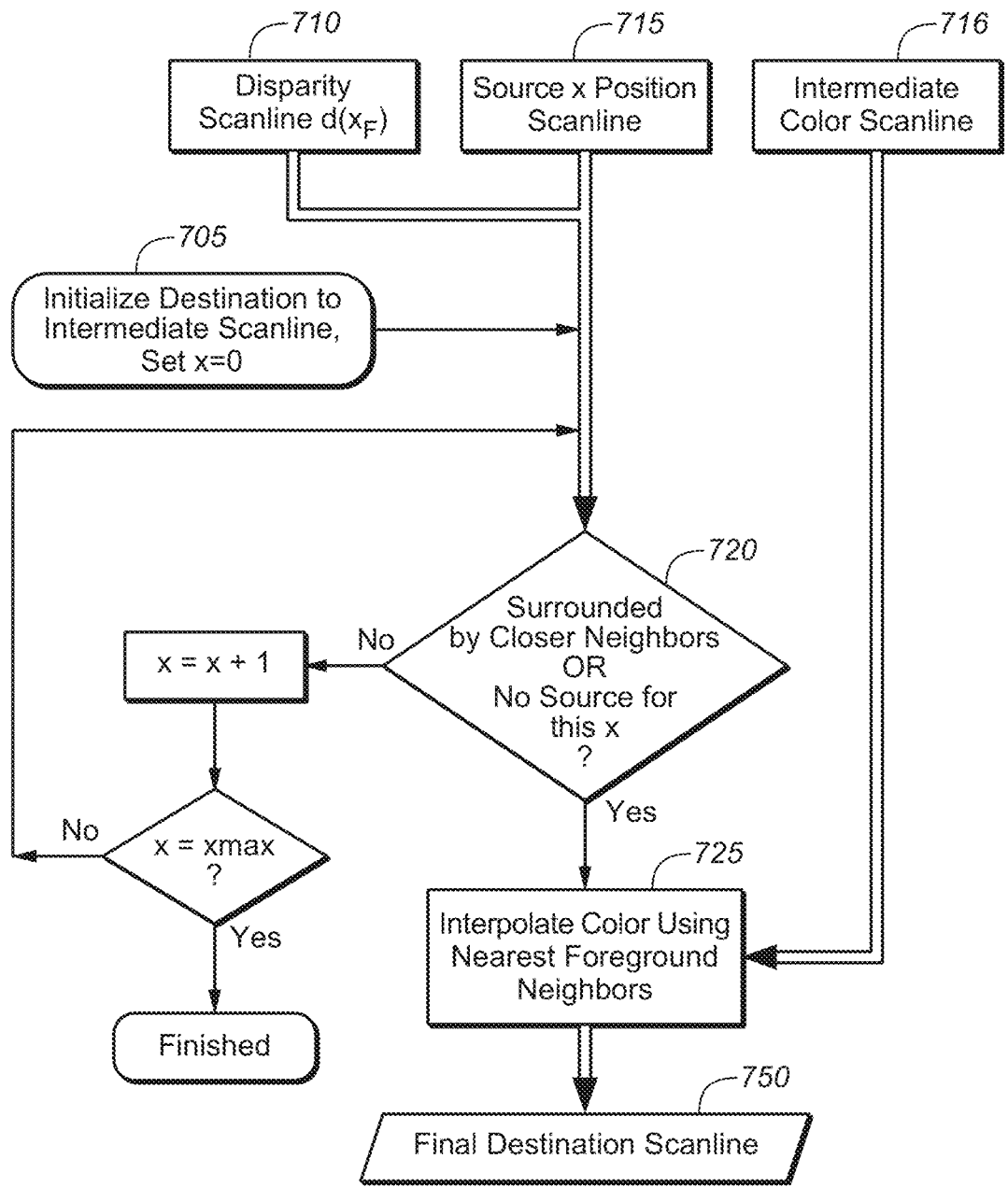
FIG. 7 depicts an exemplary embodiment of a filling algorithm for pixels.

FIG. 7 diagrams an example embodiment of a scanline filling algorithm. The algorithm of FIG. 7 may correspond to step (660) of FIG. 6, although other algorithms may be used. The algorithm of FIG. 7 works well in most cases but may also be replaced by more sophisticated algorithms known to the person skilled in the art. Step (710) in FIG. 7 corresponds to (670) of FIG. 6. Step (715) in FIG. 7 corresponds to (675) of FIG. 6. Step (716) in FIG. 7 corresponds to (680) of FIG. 6. Step (750) in FIG. 7 corresponds to (685) of FIG. 6.

Referring to FIG. 7, the algorithm begins by initializing the destination scanline (705) to be the same as the intermediate scanline (680) generated in the reconstruction method of FIG. 6. Referring to FIG. 7, the algorithm analyzes the disparity d (710) and source x position (715) inputs at each output position $x_F$ to identify pixels to fill. This analysis is done in step (720).

In (720) the algorithm determines if a pixel has no source x (for example, if a pixel has a previously determined illegal value of −1), or if the pixel has neighbors on either side that are significantly closer to the viewer (e.g., the neighbor pixels have larger disparity values). If either of the two conditions in (720) is true, then the algorithm determines that the pixel in the position under consideration needs to be filled. To fill a pixel, an example method is to interpolate (725) the color values of the identified closer neighboring pixels to the left and right of the pixel currently under consideration for filling. A scanline is then obtained (750), which corresponds to (685) of FIG. 6.

In some applications, it may happen that elements or objects in the source scene are occluded from the field of view of both the leftmost and rightmost camera views while those objects are still visible from views in-between the two camera views. Therefore, in some embodiments additional cameras are added for capturing a scene, additional to the two initial cameras creating the leftmost and rightmost viewpoints. For example, a camera in the middle may be added, to provide a mid viewpoint. These cameras can provide additional information to fill-in areas with information that would be otherwise occluded. This additional information can be encoded into the tapestry images as described in different embodiments of the disclosure, by computing the appropriate displacements to the leftmost and rightmost views. Potentially, this additional information may make a tapestry scanline longer, that is extending even further outside the dimensions of the initially captured images. In one embodiment, the additional cameras can be of the same type as the two main ones. In another embodiment, the additional cameras may be of a lower image quality and may be used to 'hint' at the occluded areas in the tapestry. In other words, the occluded areas would comprise real information from the original scene, but with a lower quality than the rest of the image. In yet other embodiments, it may be possible to use plenoptic or light field cameras.

Referring now to FIG. 3, specifically to images (326, 335, 340), the broadcasted tapestry encoded 2D image, such as image (326) or (350), may appear distorted when shown on a display device without a tapestry decoder. Therefore, for backward compatibility and to alleviate the level of distortion, it may be possible to align the individual independent scanlines at several vertically related nodal points. This procedure would probably not completely eliminate any distortion due to the tapestry encoding, however it might increase the perceptual vertical coherence of the 2D tapestry image (e.g., by reducing jagged or comb-like scanline structures).

In one embodiment, instead of compressing (normalizing) all scanlines to the same length in a linear fashion, it may be possible to identify major vertical features in one of the source images. This could, for example, be implemented with a lowpass filter followed by an edge detector. After the filtering and edge detecting steps, a certain (small) number of local maxima may be selected. Subsequently to this selection, instead of normalizing the tapestry scanline between the first and last pixel of the scanline, subsections of the scanline defined by the local maxima could be used as edges for the normalization of the subsection. Although this method would likely improve the rendering of the encoded image on 2D displays, scanline segments containing many occluded pixels will be compressed horizontally in a heavier way than areas with less occluded pixels.

Figure 8:
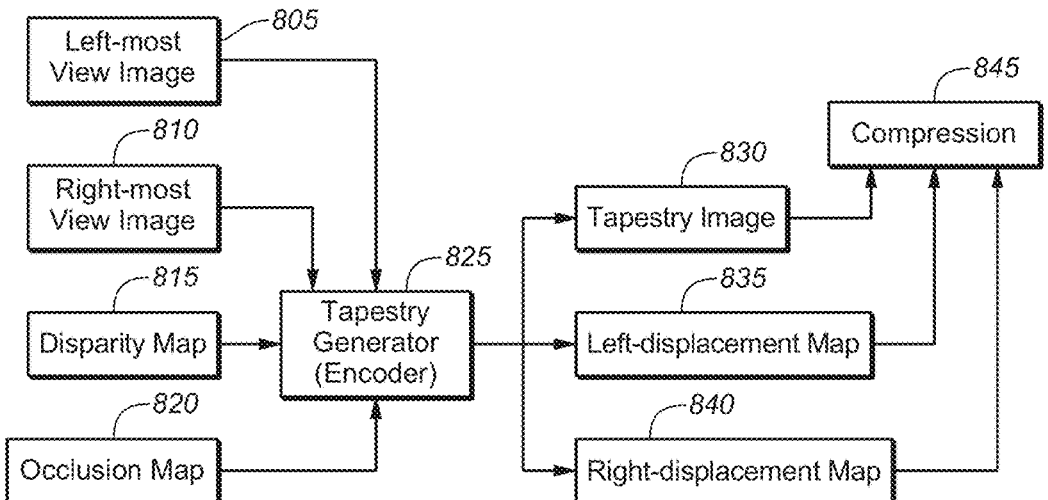
FIG. 8 depicts an exemplary embodiment of an encoder unit.

FIG. 8 illustrates an exemplary embodiment of an encoder unit. A tapestry generator (825) is adapted to generate a tapestry image set (830, 835, 840) according to the methods described in the disclosure. By using the left- and right-most view images (805, 810) as well as a disparity map (815) and an occlusion map (820), the tapestry generator (825) generates a tapestry image (830), left- (835) and right (840) displacement maps. Optionally, the encoded images can be compressed (845). Different methods for encoding and compression are known in the art.

Figure 9:
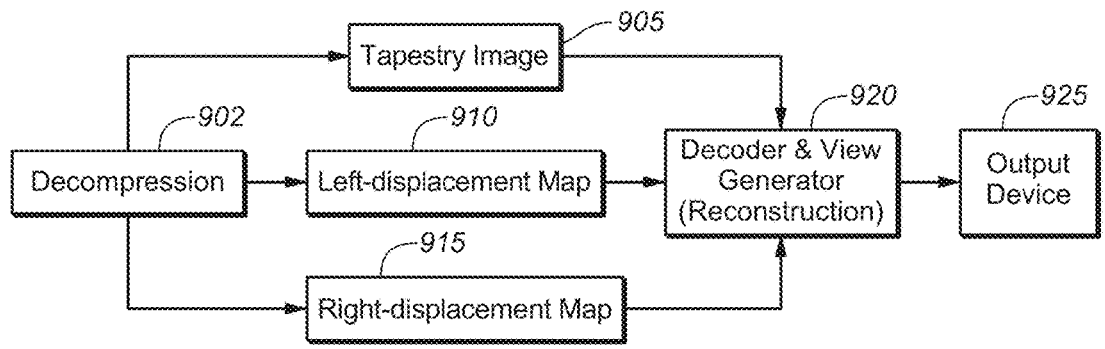
FIG. 9 depicts an exemplary embodiment of a decoder unit.

FIG. 9 illustrates an exemplary embodiment of a decoder unit. The compressed source (e.g. from 845) is decompressed (902) to a tapestry image (905), a left-displacement map (910) and a right-displacement map (915). Using the tapestry image (905), the left-displacement map (910) and the right-displacement map (915), the required views are then reconstructed by a decoder and view generator unit (920). Once a view is generated in (920), it can be sent to an output device (925) such as a display together with any other views generated in (920), either in sequence or in parallel.

Figure 10:
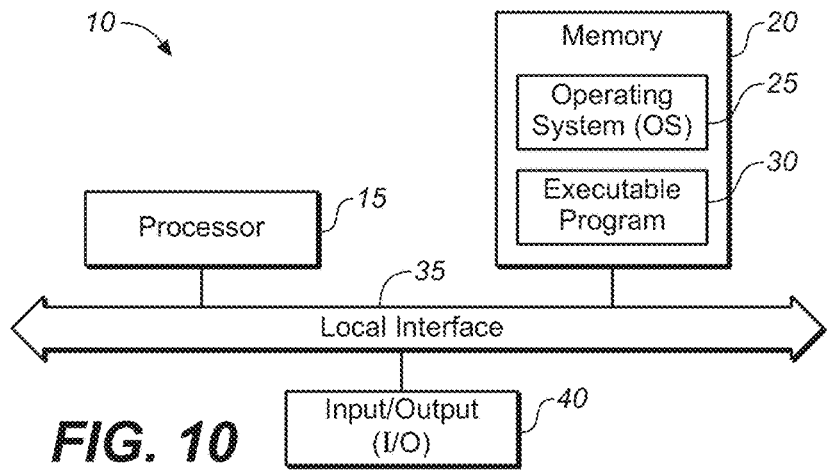
FIG. 10 depicts an exemplary computer for image processing of tapestry images.

FIG. 10 is an exemplary embodiment of a target hardware (10) (e.g. a computer system) for implementing the embodiment of FIGS. 4 and 5. This target hardware comprises a processor (15), a memory bank (20), a local interface bus (35) and one or more Input/Output devices (40). The processor may execute one or more instructions related to the implementation of FIGS. 4 and 5, and as provided by the Operating System (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 10. In some embodiments a plurality of processors may be used in a parallel configuration for added execution speed. In such a case, the executable program may be specifically tailored to a parallel execution. Also, in some embodiments the processor (15) may execute part of the implementation of FIGS. 4 and 5, and some other part may be implemented using dedicated hardware/firmware placed at an Input/Output location accessible by the target hardware (10) via local interface (35). The target hardware (10) may include a plurality of executable program (30), wherein each may run independently or in combination with one another.

The examples set forth above are provided to those of ordinary skill in the art a complete disclosure and description of how to make and use the embodiments of the gamut mapping of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM).

The instructions may be executed by a processor (e.g., a digital signal processor (DSP), an application specific integrated circuit (ASIC), or a field programmable logic array (FPGA)).

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A computer-based method for generating an autostereo tapestry image, the method comprising:
providing a leftmost view image of a scene;
providing a rightmost view image of the scene;
forming, by a computer, a disparity map, wherein the disparity map comprises distance information between the leftmost view image and the rightmost view image;
forming, by a computer, an occlusion map, wherein the occlusion map comprises information on pixels visible in the rightmost view image but not visible in the leftmost view image, and wherein disoccluded regions are not filled;
forming, by a computer, an autostereo tapestry image by inserting in the leftmost view image, based on the occlusion map and wherein disoccluded regions are not filled, the pixels visible in the rightmost view image but not visible in the leftmost view image;
forming, by a computer, a left-shift displacement map, wherein the left-shift displacement map comprises distance information between the leftmost view image and the autostereo tapestry image; and
forming, by a computer, a right-shift displacement map, wherein the right-shift displacement map comprises distance information between the rightmost view image and the autostereo tapestry image,
wherein forming the autostereo tapestry image comprises configuring the autostereo tapestry image to allow derivation of at least one view image other than the leftmost view image, the at least one view image being the rightmost.

2. The method of claim 1, further comprising compressing, by a computer, the autostereo tapestry image, the left-shift displacement map and the right-shift displacement map to a same resolution of the leftmost view image of a scene.

3. A computer-based method for generating at least two views of a scene from a tapestry image, each of the at least two views being associated with one desired viewpoint of the scene, the method comprising:
providing a leftmost view image of a scene;
providing a rightmost view image of the scene;
forming, by a computer, a disparity map, wherein the disparity map comprises distance information between the leftmost view image and the rightmost view image;
forming, by a computer, an occlusion map, wherein the occlusion map comprises information on pixels visible in the rightmost view image but not visible in the leftmost view image, wherein disoccluded regions are not filled;
forming, by a computer, an autostereo tapestry image by inserting in the leftmost view image, based on the occlusion map, wherein disoccluded regions are not filled, the pixels visible in the rightmost view image but not visible in the leftmost view image;
forming, by a computer, a left-shift displacement map, wherein the left-shift displacement map comprises distance information between the leftmost view image and the autostereo tapestry image;
forming, by a computer, a right-shift displacement map, wherein the right-shift displacement map comprises distance information between the rightmost view image and the autostereo tapestry image;
providing the autostereo tapestry image;
providing the left-shift displacement map;
providing a display parameter F, wherein the display parameter F determines a target view position between a leftmost view position and a rightmost view position; and
rendering, by a computer, the target view position, wherein forming the autostereo tapestry image comprises configuring the autostereo tapestry image to allow derivation of the target view position.

4. The method of claim 3, wherein the rendering comprises:
setting a scanline counter to zero;
rendering, by a computer, a scanline of a target view position;
incrementing the scanline counter by one; and
iterating, by a computer, the rendering and incrementing steps until the scanline counter reaches a desired value.

5. The method of claim 4, wherein the rendering step is carried out by serial or parallel computation.

6. The method of claim 4, wherein the rendering step comprises:
a) providing a position coordinate x within a first scanline for a first pixel of an autostereo image;
b) providing autostereo tapestry image information for the first pixel;
c) providing a left input displacement $d_L(x)$ for the first pixel;
d) providing a right input displacement $d_R(x)$ for the first pixel;
e) calculating, by a computer, a stereo disparity value $d_1$ for the first pixel, wherein the stereo disparity value is calculated with the equation $d_1=d_L(x)-d_R(x)$;
f) generating, by a computer, within a second scanline a position $x_F$ for a second pixel, following the equation $x_F=x+(1-F)\ d_L(x)+F\ d_R(x)$;
g) providing a stereo disparity value $d_2$ for the second pixel;
h) comparing, by a computer, the stereo disparity value for the first and second pixels;
i) setting the autostereo tapestry image information for the second pixel equal to that of the first pixel if the stereo disparity value of the first pixel is greater than the stereo disparity value of the second pixel; and
j) iterating, by a computer, steps a) to i).

7. The method of claim 6, wherein the autostereo tapestry image information comprises luminance and/or color information.

8. A non-transitory computer-readable storage medium containing instructions to execute, when run on a computer, the method of claim 3, the storage medium having stored thereon tapestry information associated with a scene, wherein the tapestry information is suitable for deriving one or more desired views of the scene, the tapestry information comprising:
the autostereo tapestry image, wherein the autostereo tapestry image comprises a first plurality of pixels comprising information from a plurality of views associated with the scene;
the left displacement map, wherein the left displacement map comprises a second plurality of pixels comprising information from a first group of pixel offsets needed for transforming between the autostereo tapestry image and the leftmost view image; and the right displacement map, wherein the right displacement map comprises a third plurality of pixels comprising information from a second group of pixel offsets needed for transforming between the autostereo tapestry image and the rightmost view image.

9. The non-transitory computer-readable storage medium according to claim 8, wherein the information associated with the first plurality of pixels of the autostereo tapestry image comprises 3-D world coordinates of each pixel in the autostereo tapestry image.

10. The non-transitory computer-readable storage medium according to claim 8, wherein the information associated with the first plurality of pixels of the autostereo tapestry image comprise depth data for each pixel in the autostereo tapestry image.

11. The non-transitory computer-readable storage medium according to claim 10, wherein the information associated with the first plurality of pixels of the autostereo tapestry image further comprise horizontal disparity data and/or vertical disparity data for each pixel in the autostereo tapestry image.

12. An encoding system, the system comprising:
a tapestry generator adapted to generate a tapestry image, a left-displacement map and a right-displacement map based on a disparity map, an occlusion map and a plurality of views comprising at least a leftmost and a rightmost input views, according to steps comprising:
providing a leftmost view image of a scene;
providing a rightmost view image of the scene;
forming, by a computer, the disparity map, wherein the disparity map comprises distance information between the leftmost view image and the rightmost view image;
forming, by a computer, the occlusion map, wherein the occlusion map comprises information on pixels visible in the rightmost view image but not visible in the leftmost view image, wherein disoccluded regions are not filled;
forming, by a computer, the tapestry image by inserting in the leftmost view image, based on the occlusion map, wherein disoccluded regions are not filled, the pixels visible in the rightmost view image but not visible in the leftmost view image;
forming, by a computer, the left-shift displacement map, wherein the left-shift displacement map comprises distance information between the leftmost view image and the tapestry image; and
forming, by a computer, the right-shift displacement map, wherein the right-shift displacement map comprises distance information between the rightmost view image and the tapestry image; and
an encoder adapted to encode the tapestry image, the left-displacement map and the right-displacement map into a bitstream, wherein forming the autostereo tapestry image comprises configuring the autostereo tapestry image to allow derivation of at least one view image other than the leftmost view image, the at least one view image being the rightmost view image or an intermediate view image being intermediate between the leftmost and the rightmost view images.

13. The system of claim 12, further adapted to compress the tapestry image, the disparity map and the occlusion map to the same dimensions of the leftmost input view.

14. A decoding system, the system comprising:
a decoder adapted to decode a tapestry image, a left-shift displacement map and a right-shift displacement map, wherein the tapestry image, the left-shift displacement map and the right-shift displacement map are based on one or more input views, according to steps comprising:
providing a leftmost view image of a scene;
providing a rightmost view image of the scene;
forming, by a computer, a disparity map, wherein the disparity map comprises distance information between the leftmost view image and the rightmost view image;
forming, by a computer, an occlusion map, wherein the occlusion map comprises information on pixels visible in the rightmost view image but not visible in the leftmost view image, wherein disoccluded regions are not filled;
forming, by a computer, the tapestry image by inserting in the leftmost view image, based on the occlusion map and wherein disoccluded regions are not filled, the pixels visible in the rightmost view image but not visible in the leftmost view image;
forming, by a computer, the left-shift displacement map, wherein the left-shift displacement map comprises distance information between the leftmost view image and the tapestry image; and
forming, by a computer, the right-shift displacement map, wherein the right-shift displacement map comprises distance information between the rightmost view image and the tapestry image; and
a view generation unit adapted to derive one or more output images of a scene based on the tapestry image, the left-shift displacement map and the right-shift displacement map.

15. The method of claim 1, wherein the left and right directions are reversed with each other.

16. The decoding system of claim 14, wherein the left and right directions are reversed with each other.

17. The method of claim 1, further comprising transmitting, by a computer, the autostereo tapestry image, the left-shift displacement map and the right-shift displacement map.

* * * * *